United States Patent [19]

Aschwanden

[11] 4,072,983
[45] Feb. 7, 1978

[54] SECAM IDENTIFICATION CIRCUIT

[75] Inventor: Felix Aschwanden, Thalwil, Switzerland

[73] Assignee: RCA Corporation, New York, N.Y.

[21] Appl. No.: 757,556

[22] Filed: Jan. 7, 1977

[30] Foreign Application Priority Data

Feb. 24, 1976 United Kingdom .............. 07247/76

[51] Int. Cl.² ......................... H04N 9/46; H04N 9/49
[52] U.S. Cl. ......................................... 358/19; 358/26
[58] Field of Search .............................. 358/19, 25, 26

[56] References Cited

U.S. PATENT DOCUMENTS

| | | | |
|---|---|---|---|
| 3,860,954 | 1/1975 | Tsuchiya | 358/19 X |
| 3,984,863 | 10/1976 | Fessard | 358/25 |
| 4,009,487 | 2/1977 | Derenbecher, Jr. | 358/19 |

Primary Examiner—Robert L. Griffin
Assistant Examiner—Aristotelis M. Psitos
Attorney, Agent, or Firm—Eugene M. Whitacre; William H. Meagher; Kenneth R. Schaefer

[57] ABSTRACT

SECAM burst signals, which recur at the line scanning rate and which change on a line-to-line basis between 4.25 MHz (corresponding to a B—Y subcarrier frequency) and 4.40625 MHz (corresponding to an R—Y subcarrier frequency) are utilized to provide line-by-line color identification and color killer signals to associated demodulation apparatus.

Synchronizing burst signals and color information signals are separated from the remainder of a composite video signal by means of a "cloche" filter which, during each active line scanning interval, is characterized by a resonant frequency of 4.286 MHz and a relatively low Q (wide bandwidth). During the burst portion of each line retrace interval, the response of the filter is shifted such that its resonant frequency corresponds to one of the burst frequencies (e.g., the R—Y burst frequency of 4.40625 MHz) and the Q is increased to provide a narrower bandwidth response. Consecutive R—Y and B—Y bursts applied to the filter are thereby respectively reinforced and suppressed. The higher amplitude R—Y bursts (which recur at one-half the line scanning rate) are supplied along with a SECAM switching square wave to a phase comparator. The output of the comparator is filtered to provide a color killer and phase correction signal to activate or inactivate the color circuits and to properly phase the bistable circuit (SECAM flip-flop) which generates the switching square wave.

10 Claims, 5 Drawing Figures

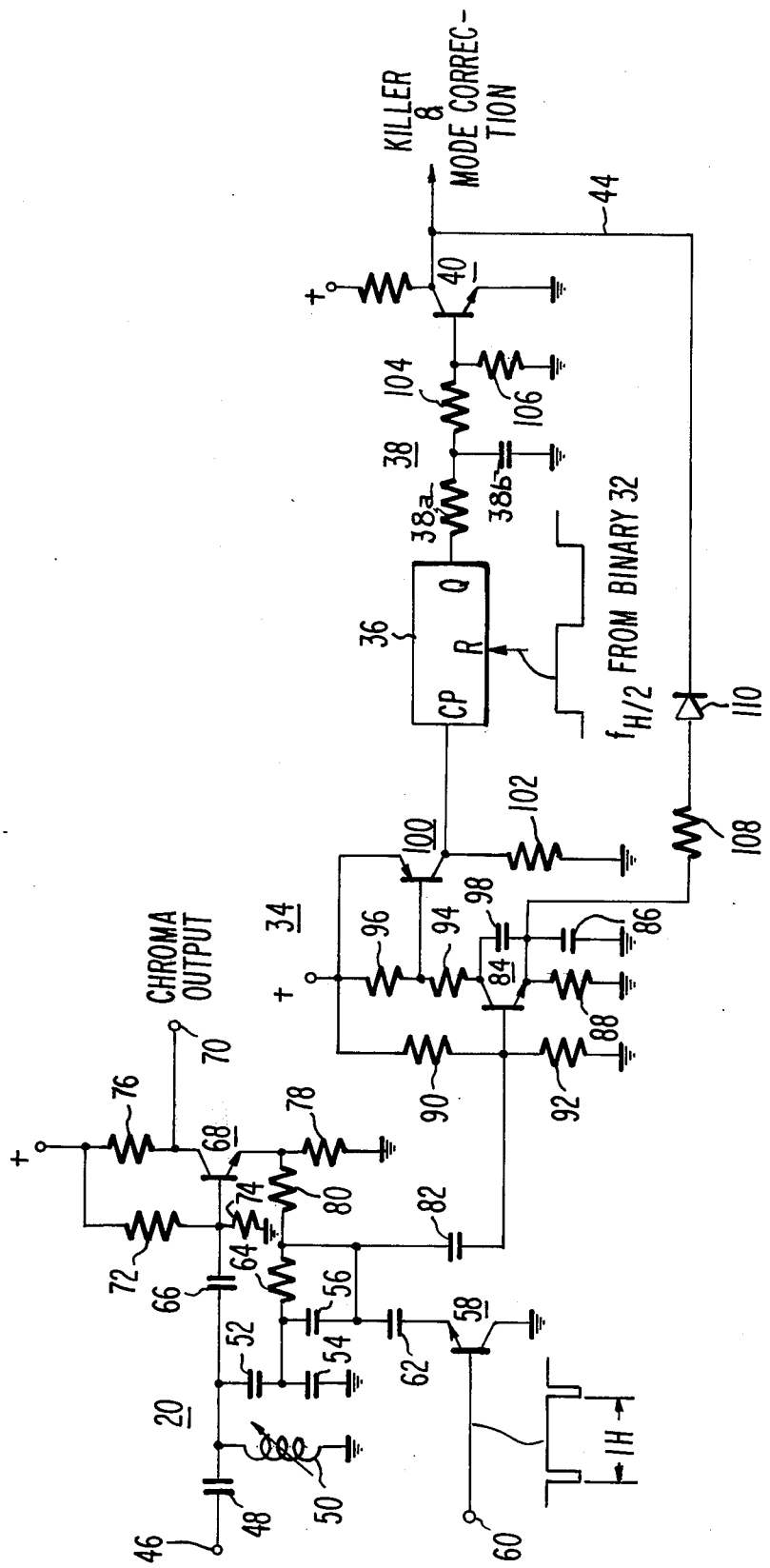

SECAM IDENTIFICATION CIRCUIT

This invention relates to color television signal processing systems and, in particular, to apparatus for detecting and utilizing line-by-line color identifying bursts contained in a SECAM-type color television signal.

In the SECAM-type color television system, two different color signal components are transmitted alternately on a line-by-line basis in the form of frequency modulation of respective carrier waves, each carrier wave having a different characteristic rest frequency (e.g., 4.25 MHz for the B−Y signal and 4.40625 MHz for the R−Y signal). As is known, appropriate demodulation of such a signal requires a switch for alternately coupling an undelayed chrominance signal and a chrominance signal delayed by one horizontal line scanning period (1H) to each of two color signal demodulators. The SECAM switch customarily is synchronized with the incoming signal by means of color identification pulses transmitted during each vertical blanking interval. A color killer (disabling circuit) also is customarily operated in response to an output from the color identification circuit indicating that color signals are not present or that the SECAM switch is not switching in the proper sequence. In such a system, the identification pulses are gated by a pulse derived from the vertical deflection flyback pulse. Any disturbance of the synchronization of the vertical deflection system can also affect color synchronization and cause the killer to operate for one or more full fields. Furthermore, in view of the recent trend to use the vertical blanking interval for transmission of additional test and reference signals, and the normal practice in magnetic tape recording of switching heads during the vertical blanking interval, there is a growing tendency away from the use of the field rate identification pulses. Instead, systems have been proposed (see, for example, U.S. Pat. Nos. 3,555,174 and 3,877,066) for synchronizing the SECAM switch by means of SECAM "bursts" which are transmitted during each line blanking interval. The SECAM bursts, like the color information, are switched from line to line between the R−Y and B−Y rest frequencies noted above.

In accordance with the present invention, a color signal identification circuit for SECAM signal processing apparatus comprises a color signal filter exhibiting a standard bell-shaped amplification versus frequency response during each line scanning interval for processing the modulated SECAM color signal carriers prior to their demodulation. Switching means are coupled to the filter for modifying its response during line retrace intervals to increase relatively the response at one of the line-by-line burst component frequencies with respect to the response at the other of the line-by-line component frequencies. A detector is responsive to burst components of increased amplitude coupled from the filter and is relatively unresponsive to the other burst components. The detector produces output pulses at one-half the line scanning rate in timed relation with the increased amplitude burst components. The half-line rate pulses are coupled to a phase comparator along with a square wave of similar frequency provided by a SECAM flip-flop or binary circuit. The phase comparator provides an error correction signal representative of the time relation of the pulses and the square wave. Means coupled to the SECAM binary circuit are responsive to the error correction signal for synchronizing the operation of the binary circuit with respect to the time sequence of the SECAM color signal carriers so as to provide proper recovery of the color information signals.

In the drawing:

FIG. 5 is a detailed schematic circuit diagram of a portion of a SECAM receiver constructed according to the block diagram of FIG. 1.

Figure 1:
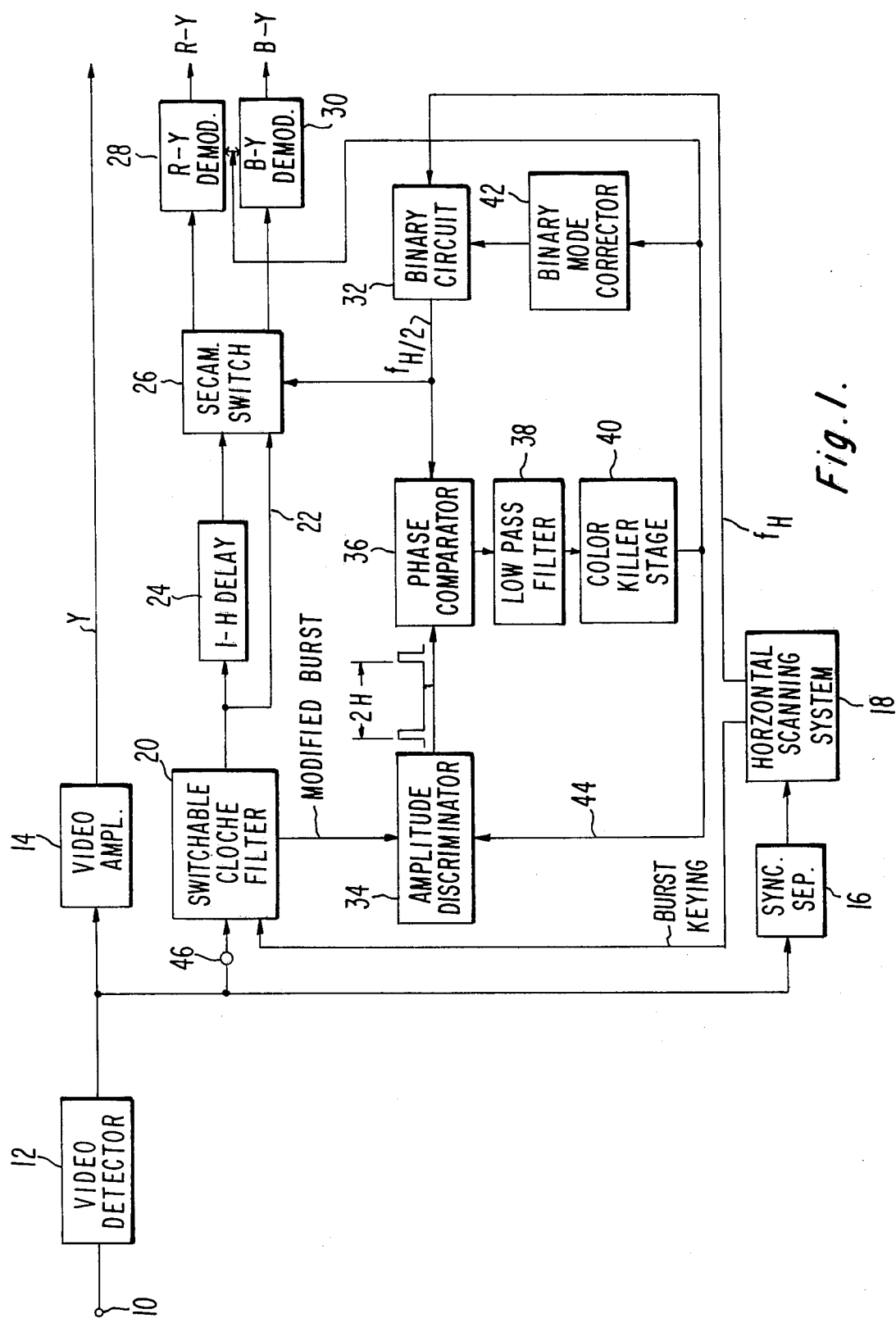
FIG. 1 is a block diagram of a portion of a SECAM color television receiver incorporating an identification and color killer system constructed according to the present invention.

Referring to FIG. 1, a composite intermediate frequency television signal is provided at a terminal 10 by, for example, a combination of a tuner and intermediate frequency amplifier stages of a type included in a conventional color television receiver. The signal at terminal 10 is converted by means of a video detector 12 to a baseband composite television signal including luminance (Y), chrominance (e.g., R−Y and B−Y) and synchronizing components. The luminance signal components are amplified in a conventional manner in a multistage video amplifier 14 for subsequent combination with detected chrominance components and application to an image display device (not shown).

A further output from video detector 12 is coupled to a deflection synchronizing signal separator circuit ("SYNC. SEP.") 16. Line (horizontal) synchronizing information in the form of pulses which recur at the line scanning rate $(f_H)$ are supplied to a horizontal scanning system 18. Scanning system 18 provides the required line scanning information to the associated display device and also provides at least two additional pulse signals identified as "burst keying" and "$f_H$" in FIG. 1.

The burst keying pulses, which are of a relatively short duration related to the duration of the burst signals and recur at the line scanning rate, are coupled to a switchable "cloche" (bell) filter 20. The composite video signal output of video detector 12 is also coupled via a terminal 46 to cloche filter 20 as is customary in systems for processing SECAM signals. The filter 20 is arranged to operate in a first mode during each active line scanning period to provide a bell-shaped amplification versus frequency characteristic centered about a frequency of 4.286 MHz as illustrated by the curve labelled "A" in FIG. 2 (a conventional response in SECAM signal processing circuits). The selectively amplified chrominance signals provided at the output of filter 20 are coupled via a direct path 22 and via a 1-H delay device 24 to a SECAM switch arrangement 26. Switch 26 operates to switch the direct and delayed color signals alternately line by line to an R−Y demodulator 28 and to a B−Y demodulator 30. When switch 26 is properly synchronized with respect to the processed color information, the R−Y signal will appear continuously at the input of R−Y demodulator 28 and the B−Y signal will appear continuously at the input of B−Y demodulator 30.

SECAM switch 26 is operated in response to a substantially square wave signal $(f_{H/2})$ provided by a binary circuit (SECAM flip-flop) 32. In accordance with the present invention, the switching square wave ($f_{H/2}$) is synchronized with respect to the incoming color signals in the following manner.

Figure 2:
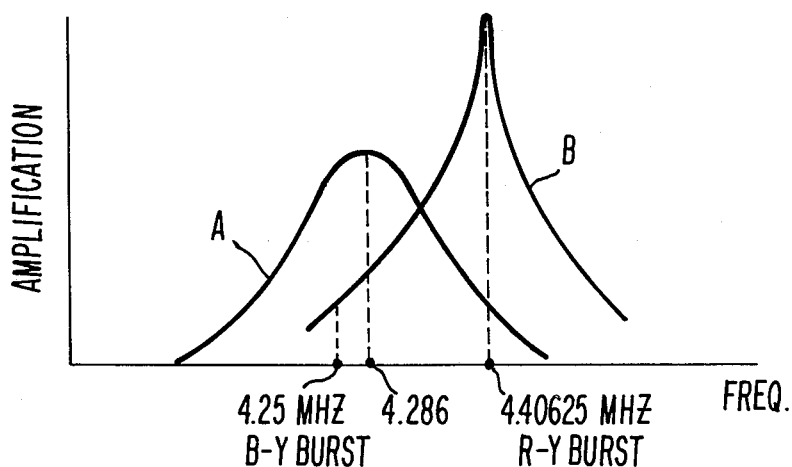
FIG. 2 illustrates amplification vs. frequency responses of a "cloche" filter of FIG. 1 during the line scanning interval and during the SECAM burst interval.

During the SECAM burst portion of each line retrace period, burst keying signals supplied by scanning system 18 switch response of cloche filter 20 to a relatively sharply tuned characteristic (illustrated by the curve labelled "B" in FIG. 2). The peak of this latter response is substantially centered about a frequency associated with one of the SECAM line burst components (e.g., the R−Y burst frequency of 4.40625 MHz). The amplitude response of filter 20 at the frequency of the other burst component is substantially lower (e.g., 10 db lower) during the burst interval as is illustrated by curve "B" of FIG. 2.

A modified burst output (shown in FIG. 3), consisting of alternately relatively high and low amplitude samples of the R−Y and B−Y burst components which recur at the line scanning rate, is coupled from filter 20 to an amplitude discriminator 34. Discriminator 34 is arranged to suppress the lower amplitude ones of the bursts so as to produce a sequence of pulses corresponding to the R−Y bursts, at one-half the line rate. The half-line rate output from discriminator 34 (shown in FIG. 4) is compared in a phase comparator 36 with the square wave output of binary circuit 32. A resulting phase error signal is filtered by means of a low pass filter 38 and the filtered direct error voltage is supplied to a color killer amplifier 40. Correct phasing of the binary circuit 32 (and hence to SECAM switch 26) results in an output from low pass filter 38 which inhibits color killer stage 40 (e.g., thereby coupling a zero voltage output to a binary mode corrector 42). Incorrect phasing of binary circuit 32 results in an output from low pass filter 38 which causes color killer stage 40 to operate (e.g., provide a positive voltage output) and to thereby cause mode corrector 42 to reset binary circuit 32 and thereby rephase its square wave output ($f_{H/2}$).

An output 44 from killer stage 40 also is coupled to amplitude discriminator 34 to modify its operation so as to avoid false triggering of the color killer stage 40 by signal level variations or noise once the color mode has been achieved.

One specific circuit arrangement constructed according to the block diagram of FIG. 1 is shown in FIG. 5. In FIG. 5, apparatus corresponding to that shown in FIG. 1 is identified by the same reference numerals as are used in FIG. 1. Thus, the composite video signal input provided by video detector 12 (FIG. 1) is coupled via terminal 46 and a coupling capacitor 48 to cloche filter 20. The standard bell-shaped response (curve "A" of FIG. 3) is provided during each line scanning period by means of the parallel tuned circuit comprising adjustable inductor 50 and capacitors 52, 54 and 56. Capacitors 52 and 54 are coupled in series across inductor 50, while capacitor 56 is coupled across capacitor 54 by means of a switching transistor 58 responsive to a burst keying waveform supplied from scanning system 18 (FIG. 1) via a terminal 60 (FIG. 5). The burst keying waveform (illustrated in FIG. 5 adjacent terminal 60) is relatively positive during the line scanning interval so as to render transistor 58 conductive (saturated) during such time and is relatively negative during each short burst interval to render transistor 58 non-conductive. A D-C isolation capacitor 62 is coupled between the emitter of transistor 58 and capacitor 56 and is selected so as not to affect the frequency response of the filter 20. A relatively low Q factor (e.g., approximately 15) associated with the bell filter 20 during each line scanning period is determined primarily by a resistor 64 coupled across capacitors 54 and 56 when transistor 58 is saturated. Relatively wide bandwidth chrominance signal components passed by bell filter 20 are coupled via a capacitor 66 and an amplifier transistor 68 to a chroma signal output terminal 70. This chroma signal output is supplied to the undelayed and delayed signal paths 22, 24 (FIG. 1).

Base bias for transistor 68 is provided by a voltage divider comprising resistors 72, 74 coupled between a source of positive voltage (+) and ground. A load resistor 76 is coupled between the collector of transistor 68 and the supply. Emitter degeneration is provided by means of a resistor 78 coupled between the emitter of transistor 68 and a reference voltage point (ground).

Switching transistor 58 is cut off during each burst interval (i.e., when the negative-going portion of the burst keying waveform is supplied). Capacitor 56 is therefore no longer returned to ground potential but rather now is coupled in parallel with resistor 64 to one end of a resistor 80, the other end of which is returned to the emitter of amplifier transistor 68. A positive feedback path is thereby formed from the emitter of transistor 68 to the filter circuit 20.

During the burst intervals, since capacitor 56 is not connected in parallel with capacitor 54, the resonant frequency of filter circuit 20 is increased. The component values are selected such that the frequency is increased to substantially coincide with the R−Y burst frequency. Closing of the positive feedback path results in the desired increase in Q (e.g., from 15 to 100) so as to provide a substantially lower response for the B−Y burst frequency as compared to the R−Y burst frequency.

Figure 3:
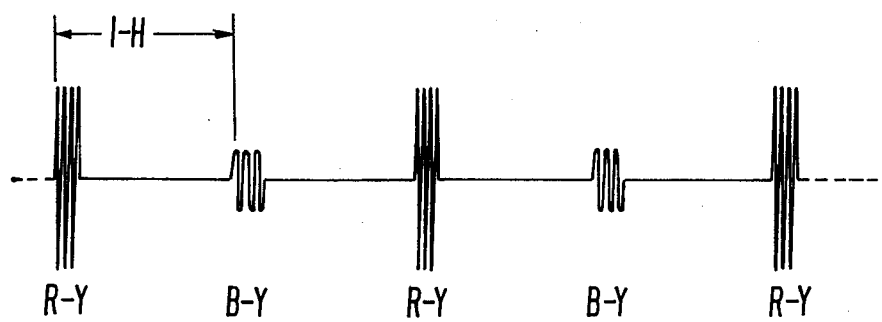
FIG. 3 illustrates the line-by-line modified burst output provided by the "cloche" filter of FIG. 1.
Figure 4:
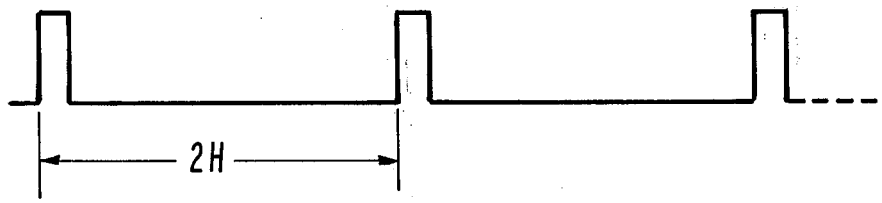
FIG. 4 illustrates the output of an amplitude discriminator of FIG. 1.

To ensure complete suppression of the lower amplitude burst component, the separated, alternating R−Y and B−Y burst signals (FIG. 3) are coupled via a capacitor 82 to the amplitude discriminator 34. Amplitude discriminator 34 comprises a detector transistor 84, a first capacitor 86 and a first resistor 88 coupled in parallel between the emitter of transistor 84 and ground, a base bias supply including second and third resistors 90, 92 coupled in a voltage divider arrangement across the voltage supply (+), and fourth and fifth resistors 94, 96 coupled in series relation as a collector load circuit for transistor 84. A second capacitor 98 is coupled between the collector and emitter of transistor 84 for increasing the effective discharging time constant of first capacitor 86 as will become apparent from the discussion below. An output transistor 100 (a PNP type) for producing pulses in response to the detection of burst signals greater than a predetermined threshold level has a base electrode coupled to the junction of resistors 94 and 96, an emitter electrode connected to the positive voltage supply and a collector electrode connected to a load resistor 102. Resistor 102 is returned to ground. A pulse waveform output (FIG. 4) having a period of 2-H is produced across resistor 102 when the burst waveform of FIG. 3 is applied to amplitude discriminator 34 as will be explained more fully below. The leading edges of the pulses of the half-line rate pulses provided by transistor 100 are representative of the time occurrence of the R−Y burst information and are applied to a clock pulse (CP) input of a bistable edge coincidence type phase comparator 36. A half-line rate ($f_{H/2}$) square wave is supplied by binary circuit 32 (FIG. 1) to a second (reset or R) input of comparator 36. Comparator 36 is responsive to the positive-going edges of this square wave. The output of comparator 36 (at terminal Q) is coupled to a low pass filter 38 for integration to provide a direct voltage representative of phase errors. The error voltage is supplied in turn to a color killer stage transistor 40 which supplies a required killer and mode correction output at its collector. A threshold error voltage for operation of transistor 40 is determined by a voltage divider comprising resistors 104, 106. A resistor 108 and a blocking diode 110 are coupled in series relation between the emitter of transistor 84 and the collector of transistor 40 via the conductor 44 to provide a "hysteresis" effect for the operation of killer stage 40 as will be explained below.

In the operation of the circuit of FIG. 5, the filter 20 provides the conventional relatively wide band response (curve "A", FIG. 2) during each active line scanning interval. Standard SECAM chrominance signals are therefore provided at terminal 70 during these intervals. During the burst portion of each line retrace interval, when transistor 58 is switched off, filter 20 is modified to provide the narrow band response (curve "B", FIG. 2) so as to couple the alternately high amplitude R−Y burst component and low amplitude B−Y burst component (FIG. 3) via capacitor 82 to amplitude discriminator 34. Detector transistor 84 is biased to conduct a relatively small quiescent current (e.g., 0.33 milliamperes). A resultant quiescent voltage drop across resistor 96 (e.g., 0.1 volts) is insufficient to cause output transistor 100 to conduct. Capacitors 98 and 86 are proportioned such that approximately one-third of the remainder of the supply voltage (e.g., 3.3 volts) appears across capacitor 86 while approximately two-thirds (e.g., 6.4 volts) appears across capacitor 98. The remainder of the supply voltage (e.g., 0.2 volts) appears across resistor 94. When the high amplitude R−Y burst component is coupled to the base of transistor 84, a relatively high collector current flows during each positive half cycle of burst. Capacitor 98 is rapidly discharged through transistor 84 while capacitor 86 charges so that, during the burst interval, its voltage will increase substantially to the peak amplitude of the burst signal applied at the base of transistor 84. The voltage across transistor 96 is then sufficient to cause transistor 100 to saturate, causing the voltage produced at the collector of transistor 100 to increase rapidly. The resulting leading edge of a pulse waveform (FIG. 4) sets the phase comparator 36 to a first state.

Following the burst, no signal is supplied to transistor 84, the voltage developed across capacitor 86 during the burst interval reverse biases transistor 84 and transistor 100 switches off. The collector voltage of transistor 100 therefore drops as illustrated by the trailing edges of the pulses in the waveform of FIG. 4. Capacitor 86 tends to discharge exponentially through resistor 88 at this time. However, capacitor 98 begins to recharge from the voltage supply via resistors 94 and 96. A portion of this charging current also flows in capacitor 86 (the remainder flowing in resistor 88). The values of the several components preferably are selected such that the resultant voltage across capacitor 86 declines at a slower rate than the exponential rate and, in fact, such values preferably are selected to provide a substantially linear discharge during the succeeding 2-H period (e.g., 128 microseconds).

Transistor 84 is therefore still reverse biased when the relatively smaller B−Y burst signal is applied one line interval (1-H) later. Since the capacitor 86 is discharged linearly over a period of two line intervals (2-H), the circuit completely suppresses the B−Y burst if its peak amplitude is less than one-half the peak amplitude of the R−Y burst. The response of the filter 20 (curve "B") is arranged to insure this condition with considerable margin (i.e., the B−Y response is 10 db lower than the R−Y response). The amplitude discriminator circuit 34 operates in this manner for a wide range of absolute burst amplitudes.

The output pulse waveform (FIG. 4) produced at the collector of transistor 100 is compared with the output from binary 32 (FIG. 1) in phase comparator 36. The phase comparator 36 consists of a flip-flop which is set by the leading edges of the output pulses from transistor 100 and is reset by the positive-going edge of the $f_{H/2}$ square wave from binary 32. If the operating mode (phase) of binary 32 is correct, the output (at terminal Q) from comparator 36 will be a square wave at a frequency of $f_{H/2}$. This square wave is integrated by the low pass filter 38 to provide a sufficiently positive voltage at the base of transistor 40 to cause it to turn on. A resultant zero voltage output from transistor 40 serves to maintain operation of (i.e., to "unkill") the associated demodulators 28, 30 and to maintain the operation of binary 32 without re-phasing. When such proper "identification" and switching has been accomplished, a hysteresis loop is connected to the amplitude discriminator 34. Specifically, with zero volts at the collector of killer stage 40, diode 110 will be forward biased, connecting resistor 108 in parallel with resistor 88. The sensitivity (gain) of discriminator 34 is thereby increased and transistor 100 will conduct for burst signals of lower absolute amplitude than would be required initially. Such an arrangement will prevent unwanted color flickering when momentary signal disturbances are encountered.

Initially, if the absolute amplitude of the R−Y burst is below a predetermined level, the voltage produced across resistor 96 will not be sufficient to turn on transistor 100. As a result, no output pulses will be produced at the collector of transistor 100. This condition will exist when no color signal is being received, when weak color signals are received or when the burst keying pulses are not properly synchronized with respect to the incoming signal. In any of those cases, since no pulses are coupled to the CP input of comparator 36, the output signal produced across filter 38 will be zero. Killer stage 40 will therefore be maintained cut off, producing a positive voltage at its collector. This positive voltage will produce appropriate disabling of the associated color demodulators 28, 30 and, furthermore, mode corrector 42 will respond to such a positive voltage to cause re-phasing of the SECAM flip-flop 32.

While the invention has been described in terms of a particular embodiment thereof, various modifications may be made without departing from the scope of the invention.

The particular circuit shown in FIG. 5 may be constructed utilizing the following component values:

| Capacitor | 38b | 2.2 microfarads |
|---|---|---|
| " | 48 | 33 picofarads |
| " | 52 | 560 picofarads |
| " | 54 | 560 picofarads |
| " | 56 | 82 picofarads |
| " | 62 | .1 microfarads |
| " | 66 | 1,000 picofarads |
| " | 82 | 1,000 picofarads |
| " | 86 | .047 microfarads |
| " | 98 | .015 microfarads |
| Resistor | 38a | 10,000 ohms |

| | | |
|---|---|---|
| " | 64 | 330 ohms |
| " | 72 | 10,000 ohms |
| " | 74 | 10,000 ohms |
| " | 76 | 470 ohms |
| " | 78 | 1,000 ohms |
| " | 80 | 68 ohms |
| " | 88 | 10,000 ohms |
| " | 90 | 15,000 ohms |
| " | 92 | 10,000 ohms |
| " | 94 | 680 ohms |
| " | 96 | 330 ohms |
| " | 102 | 10,000 ohms |
| " | 104 | 6,800 ohms |
| " | 106 | 10,000 ohms |
| Inductor | 50 | 5.5 microhenry (variable) |
| Comparator | 36 | RCA type CD 4027 |

What is claimed is:

1. In a system for processing color television signals of the SECAM type in which a binary circuit for producing a substantially square wave output recurring at one-half of the image line scanning rate is included for synchronizing the demodulation of at least first and second color signal carriers of different frequencies recurring alternately in a line-by-line sequence and modulated during line scanning intervals with respective color image information signals, said SECAM type signal further including first and second synchronizing burst components having frequencies corresponding, respectively, to those of said carriers and occurring during line retrace intervals adjacent in time to an associated color carrier, a color signal identification circuit comprising:

signal filtering means exhibiting a bell-shaped amplification versus frequency response during said line scanning intervals for processing said color signal carriers prior to demodulation thereof;

switching means coupled to said filtering means for modifying said bell-shaped response during said line retrace intervals to increase relatively the response at one of said burst component frequencies with respect to the response at the other of said burst component frequencies;

detection means coupled to said filtering means, responsive to burst components of increased amplitude coupled from said filtering means and relatively unresponsive to said other burst components, for producing output pulses at one-half said line scanning rate in timed relation with said increased amplitude burst components;

phase comparator means responsive to said pulses and to said square wave for providing an error correction signal representative of the time relation of said pulses and said square wave; and means coupled to said binary circuit and responsive to said error correction signal for synchronizing the operation of said binary circuit with respect to the time sequence of said first and second carriers so as to provide proper recovery of said color information signals.

2. A color signal identification circuit in accordance with claim 1, wherein:

said signal filtering means exhibits a relatively wide bandwidth response during said line scanning intervals; and said switching means is operative to decrease said bandwidth during said line retrace intervals.

3. A color signal identification circuit according to claim 2, wherein:

said bell-shaped response is a maximum at a frequency between said burst component frequencies; and said one of said burst component frequencies at which said response is increased during line retrace intervals is the higher one of said burst component frequencies.

4. A color signal identification circuit according to claim 3, wherein:

said filtering means comprises a resonant combination of inductance and capacitance; and said switching means is operative to reduce said capacitance during said line retrace intervals and thereby increase the resonant frequency of said filter.

5. A color signal identification circuit according to claim 4, wherein:

said filtering means further comprises a resistance; and said switching means is operative to reduce said resistance during said line retrace intervals and thereby increase the Q of said filter.

6. A color signal identification circuit according to claim 1, wherein:

said detection means comprises a peak signal level detector and means coupled to said detector for maintaining said detector relatively unresponsive to input signals less than a predetermined level established by the amplitude of input signals detected during a preceding line scanning interval.

7. A color signal identification circuit according to claim 6, wherein:

said predetermined level is established substantially equal to one-half the peak amplitude of input signals detected during said preceding line scanning interval.

8. A color signal identification circuit according to claim 6, wherein:

said peak detector includes an emitter follower transistor, a filter capacitor coupled between the emitter of said transistor and a reference potential, and said means coupled to said detector for maintaining said detector relatively unresponsive comprises a further capacitor coupled across said transistor and a source of charging current coupled to said further capacitor and said filter capacitor in series relation.

9. A color signal identification circuit according to claim 1, wherein:

said means responsive to said error correction signal is operative to provide a color killer signal for interrupting demodulation of said color information signals when said binary circuit is improperly phased with respect to the time sequence of said carriers.

10. A color signal identification circuit according to claim 9, wherein:

said means responsive to said error correction signal is further coupled to said detection means for increasing the sensitivity thereof when said error correction signal is indicative of correct phasing of said binary circuit with respect to said time sequence of said carriers.

* * * * *

UNITED STATES PATENT OFFICE
CERTIFICATE OF CORRECTION

PATENT NO. : 4,072,983

DATED : February 7, 1978

INVENTOR(S) : Felix Aschwanden

It is certified that error appears in the above-identified patent and that said Letters Patent are hereby corrected as shown below:

Column 2, line 51, "frequency characteristic" should read -- frequency response characteristic --. Column 3, line 6, "switch response" should read -- switch the response --; line 30, "hence to SECAM" should read -- hence of SECAM --. Column 5, line 44, "transistor 96" should read -- resistor 96 --.

Signed and Sealed this

Twenty-first Day of November 1978

[SEAL]

Attest:

RUTH C. MASON
Attesting Officer

DONALD W. BANNER
Commissioner of Patents and Trademarks